No. 691,054. Patented Jan. 14, 1902.
F. R. HIESTER.
STEERING MECHANISM FOR MOTOR VEHICLES.
(Application filed Sept. 28, 1901.)
(No Model.)
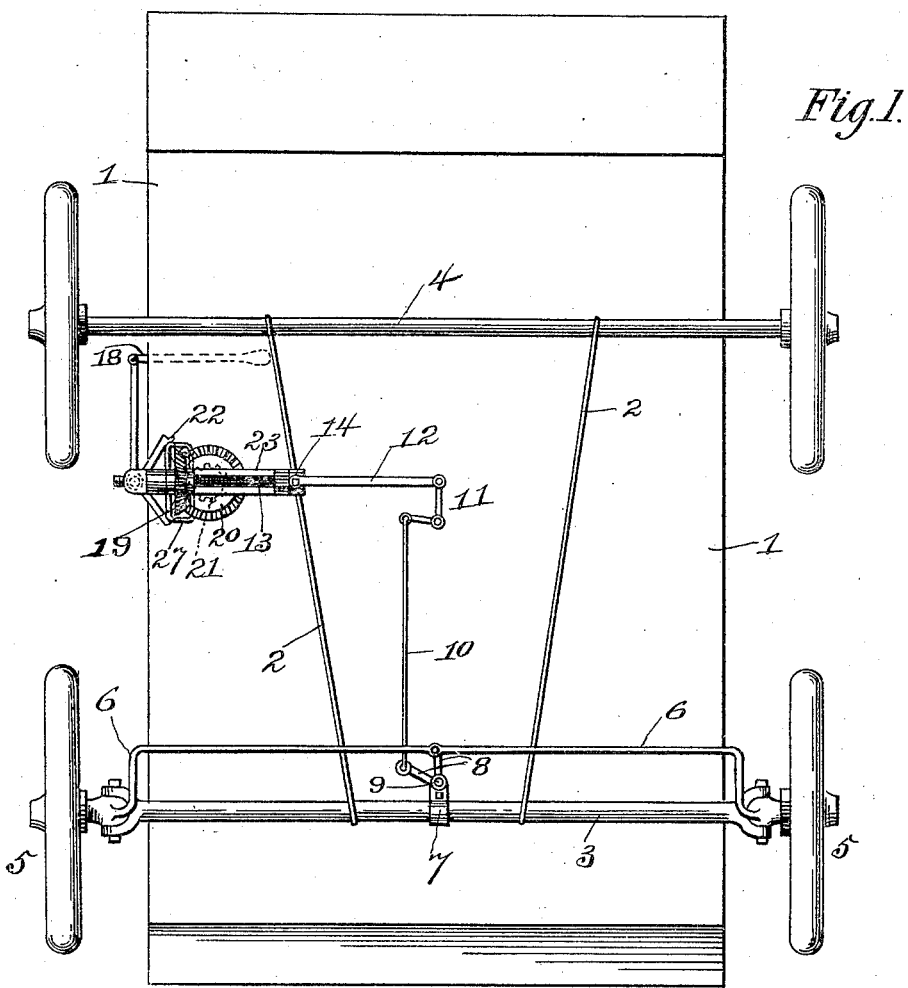

UNITED STATES PATENT OFFICE.

FRANKLIN R. HIESTER, OF CENTERPORT, PENNSYLVANIA.

STEERING MECHANISM FOR MOTOR-VEHICLES.

SPECIFICATION forming part of Letters Patent No. 691,054, dated January 14, 1902.

Application filed September 28, 1901. Serial No. 76,898. (No model.)

*To all whom it may concern:*

Be it known that I, FRANKLIN R. HIESTER, a citizen of the United States, residing at Centerport, in the county of Berks and State of Pennsylvania, have invented certain new and useful Improvements in Steering Mechanism for Horseless Vehicles, of which the following is a specification.

This invention relates to a steering mechanism for horseless carriages; and it consists of improvements upon my patent granted May 21, 1901, No. 674,409.

The object of the invention is to provide new and peculiar means for working the front wheels of a horseless vehicle from the operator's seat.

A further object of the invention is to provide a peculiar connection between the steering or wheel levers and the hand-lever.

A still further object of the invention is to provide a frame of special construction for the mechanism which imparts motion from the hand-lever to the wheel-levers.

In the accompanying drawings, forming a part of this application, Figure 1 is an inverted plan view of a horseless vehicle with my steering mechanism attached. Fig. 2 is a longitudinal section of the mechanism with the levers partly broken away. Fig. 3 is a perspective view of the frame for the mechanism. Fig. 4 is a detail sectional view of the screw-shaft head and grooved collar. Fig. 5 is a sectional view, partly broken away, of a modified form of the mechanism.

The same numeral references denote the same parts throughout the several views of the drawings.

The vehicle 1 has the usual braces 2, connecting the front and rear axles 3 and 4, respectively. The front wheels 5 have the usual pivot connection with the front axle, and the hubs of said front wheels are connected by a bar 6. A clip 7 is secured to the front axle and has a lever 8 pivoted thereto at 9. One end of the lever is attached to the bar 6, and the other end has connected to it a lever 10, which connects the lever 8 with an angle-lever 11, the latter having one end of a connecting-rod 12 attached thereto. The other end of said rod is connected to a screw-shaft 13 by a collar 14, having a peripheral groove 15. The collar permits the shaft to be turned therein, and said collar is made to follow the longitudinal movement of the shaft without revolving with it by the prongs 16, secured to the shaft-head 17 and engaging the groove 15.

The mechanism for transmitting the motion or movement of the hand-lever 18 to the steering-levers consists of the screw-shaft 13, with its peculiar collar 14 and head 17, a gear 19, having an internally-screw-threaded hub and loose upon the shaft 13 and meshing with a gear 20, having a pinion 21, operated by a toothed segment 22, controlled by said hand-lever, which is pivoted at $22^a$ to swing vertically.

The frame for the screw-shaft, segment, and gearing consists of a tubular shell 23, having an opening 24, in which the gear 19 works, and is fixed against longitudinal movement by the shaft-bearing ends 25 and 26 of the frame, said ends being connected by loops 27, a support 28, in which the gear 20 is journaled, a projection 29, in which the segment is pivoted, a standard 30, attached to the vehicle, and similar standard 31, attached to one of the vehicle-braces 2, the said shaft being worked freely through the shell 23 and bearings 25 and 26 by operating the gear 19 on the thread of the shaft, which turns and slides the latter back and forth in said bearings and through the shell or frame.

In the modification shown in Fig. 5 the mechanism is the same as that just described, except that the segment and pinion are dispensed with, and the shaft-head 32 has a shoulder in which the collar 33 works, and the gears are operated by a hand-crank 34.

It is obvious that any movement of the hand-lever will be imparted to the steering-levers, because of the shaft being free to move by the action of the gear 19 through the said gear and the fixed frame carrying the collar 14, with the shaft-head, back and forth at the inner end of the frame.

Having thus described my invention, what I claim as new, and desire to secure by Letters Patent, is—

1. The combination, with the frame, and the screw-shaft, the head thereof having prongs, of the grooved collar held loose upon the shaft by the prongs to receive the longitudinal movement of the shaft without rotary motion.

2. The combination, with the screw-shaft, and the gearing, of a shell or frame in which the shaft is permitted to turn and slide, said frame having an opening, loops around the opening in which one of said gear is fixed against longitudinal movement to turn the shaft, supports on the frame for the others of said gear, and standards by which the frame is fixed.

3. In combination, the levers connected to the front wheels of a vehicle, a suitable hand-lever, a screw-shaft, a gear screwed upon the shaft to turn and slide it, a collar held against turning by the shaft-head, a frame to hold said gear against longitudinal movement and to permit the shaft to rotate and slide therein, and the gearing to operate said gear.

4. In combination, the frame, the screw-shaft rotatably and slidably held by the frame, a collar held by the shaft-head so as to receive the longitudinal movement of the shaft without turning, means to give the shaft a rotary and longitudinal movement, consisting of a gear screwed upon the shaft and fixed by the frame against longitudinal movement, a gear meshing with said shaft-gear and carrying a pinion, a toothed segment meshing with the pinion, and a hand-lever to operate the segment.

In witness whereof I hereunto set my hand in presence of two witnesses.

FRANKLIN R. HIESTER.

Witnesses:
DARIUS B. RENTSCHLER,
JAMES G. MATTERNES.